United States Patent [19]

Shimura et al.

[11] 4,303,688
[45] Dec. 1, 1981

[54] METHOD OF PRODUCING FIBROUS FISH PASTE

[75] Inventors: Naohiko Shimura, Konosu; Takeo Shinada, Kawagoe; Mituga Ikoma, Sayama; Hisao Nakashima, Kawagoe, all of Japan

[73] Assignee: Kibun Company Limited, Tokyo, Japan

[21] Appl. No.: 100,436

[22] Filed: Dec. 5, 1979

[51] Int. Cl.³ .................... A22C 25/20; A23L 1/325
[52] U.S. Cl. ............................... 426/513; 426/516; 426/517; 426/518; 426/643
[58] Field of Search ............. 426/641, 643, 511, 513, 426/516, 517, 518, 519, 520

[56]  References Cited
U.S. PATENT DOCUMENTS 3,852,487 12/1974 Van Werven ..................... 426/643
3,863,017 1/1975 Yueh ............................. 426/513 X
4,158,065 1/1979 Sugino ........................... 426/513 X

FOREIGN PATENT DOCUMENTS 46-17938 5/1971 Japan ............................. 426/643
51-41470 4/1976 Japan ............................. 426/643

Primary Examiner—Arthur L. Corbin
Attorney, Agent, or Firm—Browdy and Neimark

[57] ABSTRACT

Fibrous boiled fish paste is produced by adding water to minced meat, mixing both with agitation, molding the mixture into a certain shape, subjecting it to setting, dividing it finely into the form of fibers or flat pieces extending in parallel and then heating the resulting finely divided product without separating each fiber or flat piece individually. The resulting boiled fish paste comprises an inner part coated with an outer surface forming a pellicle united to the inner part. The inner part is divided finely into the form of fibers or flat pieces in parallel to such a degree that each fiber or flat piece separates individually with ease in the mouth upon eating. This boiled fish paste is united in a body in appearance, but it loosens immediately in fiber-like manner in the mouth upon eating and it has an improved mouth feel.

2 Claims, No Drawings

METHOD OF PRODUCING FIBROUS FISH PASTE

The present invention relates to a method of producing fibrous boiled fish paste having a novel mouth feel.

More particularly it relates to a method of producing boiled fish paste which, although it has the same appearance as prior art one, gives a novel mouth feel due to the fact that the inner part thereof loosens in fiber- or flat-like manner in the mouth when eating.

Hitherto the following boiled fish pastes have been sold in the market: one prepared by dividing finely the boiled fish paste, which is a final product obtained after heating, into the form of stick-like meat of a crab's foot, or one prepared by dividing finely the boiled fish paste, mixing them with minced fish meat, molding the mixture into a certain shape as one body and heating it to obtain the stick-like meat of a crab's foot. However, in these products obtained by prior art methods, many dividing lines appear on the surface thereof or the fibrous ones protrude therefrom, with the result that they display a lack of good appearance.

The present inventors have pursued their studies of obtaining a novel boiled fish paste that is fibrous in the inner part thereof in spite of presenting the same external appearance as the prior art products, and as a result found that if the minced fish meat is molded into a certain shape and divided finely at the time of subjecting it to setting and then heated completely, it is possible to produce such a product that keeps divided inside thereof though the outer surface thereof is united into a body by heating.

The present invention relates to a method of producing boiled fish paste which comprises adding water to minced meat, mixing both with agitation, molding the mixture into a certain shape, subjecting it to setting, dividing it finely in fiber-like or flat-like manner parallel in the same direction and then heating the resulting finely divided pieces into one united body, namely while maintaining the united state, without separating them individually.

This produces the product of the present invention whose inside is finely divided into the form of fibers or flat pieces in parallel to such a degree that each fiber or flat is able to separate individually with ease at the time when eating, but, whose outer surface is in the state forming a united pellicle by the heating step.

The most important characteristic of this invention lies in that the raw material is divided finely at the time of subjecting it to the setting, namely before it hardens, followed by the perfect heating to harden it completely. Due to such a treatment, the finely divided pieces in the inner part thereof never adhere to each other in spite of the final heating, and therefore they are individually separated in fiber-like manner with ease in the mouth. However, on the outer surface thereof, a pellicle is formed in one united body by the final heating, and consequently the resultant product does not differ from conventional product in appearance. When eating the boiled fish paste thus obtained, it is possible to enjoy such a novel mouth feel that has never been able to be tasted by eating the prior art ones.

As fish for producing the minced fish meat used in the present invention, there may be used fish such as pollack, white croaker, shark or any other commonly employed fish for producing boiled fish paste selected by the practitioner, and preferably frozen minced meat thereof can be utilized. The minced fish meat can be used with or without addition of other meats, such as that of lobster, crab, scallop and the mixture thereof, so that according to the degree of dividing, various characteristic tastes can be also enjoyed.

Generally speaking, the desired results can be attained utilizing from 40 to 70 percent by weight of water relative to the minced fish meat to be treated.

The minced fish meat added with water is mixed with agitation. In case of using a cutter mixer, it is usual to mix it for from 6 to 12 minutes with agitation.

The minced fish meat, which has been conditioned and seasoned by mixing with agitation, is molded into a certain shape and subjected to setting. As the setting, in general, there are two kinds: that is to say the low temperature setting and the high temperature setting. The former is carried out at an adequate temperature between 0° C. and 25° C. for twenty-four hours and the latter is carried out at an adequate temperature between 25° C. and 40° C. for from 30 minutes to 90 minutes. According to the present invention, the kind of the setting may be either low or high temperature setting, and preferably the setting is carried out at a temperature between 30° C. and 35° C. for from 40 minutes to 70 minutes. The dividing duration may vary within large limits, and according thereto, it is possible to change dividing size and hardness of the divided section. However, this finely dividing treatment must be carried out in such a state that the divided sections are adhered each other for the second time, and at the same time in such a state that the surface is joined thereto in a body to form a pellicle by the final heating treatment.

After the setting, then, the resultant product is finely divided in parallel. The shape of the divided sections may be any one of square, circle, hexagon, rectangle, flat, etc. In general, when the minced fish meat of a certain section shape is extruded at a stroke through a cutting die having such a shape which is mounted at an exit of the extruder, it is extruded in the state of being finely divided longitudinally while maintaining the same shape of the section, and unless it is extruded so strongly as to be broken, it may be transferred to the final heating stage as it is. Furthermore, by means of this cutting technique with extruding, the fibrous paste product thus cut while extruding is somewhat wavy, so that it is well re-adhered at the final heating.

The minced fish meat molded into a predetermined shape is finely divided in parallel, followed by the heating treatment. The heating treatment is selected among steaming, broiling, boiling with oil, etc., in consideration of the desired end product. The boiled fish paste is produced by heating with steam, and the fried fish ball is produced by heating once with steam then frying or by finely dividing then frying. The fried bean curd and Chikuwa (a kind of fish paste) are produced by heating once with steam then broiling. Due to these heating treatments, the finely divided sections near the surface are continuously joined as one body to form a pellicle that does not differ from conventional boiled fish pastes, fried fish balls, Chikuwaes, etc., in appearance. Namely, the boiled fish paste according to the present invention does not differ at all from the prior art products in appearance. However, in the inner part thereof, it is finely divided into an adequate section shape resulting in giving a novel mouth feel never before tasted.

Next, the present invention is described in the following Example.

EXAMPLE 1

80 Parts by weight of pollack minced meat of SA grade was mixed with 20 parts by weight of crab meat, and 50 parts by weight of water was added thereto. Then the mixture was put in a cutter mixer and mixed for 10 minutes with agitation.

The thus mixed minced meat was molded into a rectangular shape, subjected to setting at 32° C. for 60 minutes, and extruded through an extruder having mounted circular assembled blades each having a diameter of 1 mm, so that there was obtained an aggregate which was composed of the aggregation of many fibrous pieces having a diameter of 1 mm but which presented one rectangular block in appearance.

This block was put in a cooker where it was heated with steam sufficiently to heat the central part thereof at a temperature of 80°~85° C., thereby obtaining a product which presented a rectangular form and did not differ from conventional boiled fish pastes in appearance. On the surface thereof a picture of crab was printed to produce a product called boiled crab meat paste.

When eating such a boiled crab meat paste, edible texture just like that of meat of a crab's foot was obtained by the fibrous pieces have a diameter of 1 mm. It tasted like natural crab's meat, and an improved mouth feel was obtained as if eating natural crab's meat.

EXAMPLE 2

100 Parts by weight of pollack minced meat of SA grade was mixed with 3% of table salt. The mixture was mixed for 10 minutes with agitation in a silent cutter by conventional techniques, and 40 parts by weight of water and 5 parts by weight of extract of scallop was added thereto. Mixing was then continued with agitation for 5 minutes.

The thus obtained minced fish meat seasoned with scallop extract was molded into a cylinder having a diameter of 3 cm and a length of 20 cm, subjected to setting at 30° C. for 50 minutes and extruded through an extruder having mounted circular assembled blades each having a diameter of 1 mm, so that there was obtained an aggregate which was composed of an aggregation of many fibrous pieces like eyes of scallop having a diameter of 1 mm but which presented one cylindrical block in appearance.

This was cut to the same length as the natural eyes of scallop, then was fried with butter in a frying pan, Thereby, in spite of the fact that the product was a kind of boiled fish paste, there was obtained a product which had the taste and mouth feel like natural eyes of scallop fried with butter.

What is claimed is:

1. A method of producing fish paste, consisting essentially of:
   adding water to fish meat consisting essentially of minced fish meat, in an amount of from 40% to 70% of the minced fish meat;
   mixing the minced fish meat and water to form a minced fish product;
   molding the minced fish product into a predetermined shape;
   setting the molded product;
   finely dividing the set product into a plurality of fibers or flat pieces extending in parallel; and then
   heating the resulting plurality of parallel finely divided fibers or flat pieces without separating each fiber or flat piece individually,
   thereby obtaining a fish paste whose inner part has been finely divided into the form of fibers or flat pieces consisting essentially of minced fish meat and water, all of said fibers of flat pieces being in parallel and at the same time joined to each other to such a degree that each fiber or flat piece separates individually with ease in the mouth upon eating, and wherein the outer surface of said fish paste is in the form of a pellicle united to the inner part of said fish paste as one body.

2. A method according to claim 1, wherein said minced fish meat contains meat of marine animals selected from the group consisting of lobster, crab and scallop.

* * * * *